United States Patent
Booth et al.

(10) Patent No.: US 9,758,034 B2
(45) Date of Patent: Sep. 12, 2017

(54) FILLER NECK ASSEMBLY AND METHOD FOR PRODUCING SAME

(71) Applicant: Inergy Automotive Systems Research (Societe Anonyme), Brussels (BE)

(72) Inventors: Neall Patrick Booth, LaSalle (CA); Damon Upton, Ray, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 10 days.

(21) Appl. No.: 14/649,342

(22) PCT Filed: Dec. 4, 2013

(86) PCT No.: PCT/EP2013/075482
§ 371 (c)(1),
(2) Date: Jun. 3, 2015

(87) PCT Pub. No.: WO2014/086826
PCT Pub. Date: Jun. 12, 2014

(65) Prior Publication Data
US 2015/0314677 A1    Nov. 5, 2015

Related U.S. Application Data

(60) Provisional application No. 61/733,012, filed on Dec. 4, 2012.

(30) Foreign Application Priority Data

Jul. 3, 2013 (EP) .................................. 13174964

(51) Int. Cl.
*B60K 15/04* (2006.01)
*B60K 15/03* (2006.01)
(Continued)

(52) U.S. Cl.
CPC ...... *B60K 15/0406* (2013.01); *B29C 45/0003* (2013.01); *B60K 13/04* (2013.01);
(Continued)

(58) Field of Classification Search
CPC .......... B60K 15/0406; B60K 15/03177; B60K 15/04; B60K 13/04; B60K 2015/03032;
(Continued)

(56) References Cited

U.S. PATENT DOCUMENTS 2,138,104 A   11/1938 Kellogg
3,133,564 A   5/1964 Hunter
(Continued)

FOREIGN PATENT DOCUMENTS

CN   2823022 Y   10/2006
CN   1911699 A   2/2007
(Continued)

OTHER PUBLICATIONS

International Search Report Issued Mar. 7, 2014 in PCT/EP13/075482 filed Dec. 4, 2013.

*Primary Examiner* — Nicolas A Arnett
(74) *Attorney, Agent, or Firm* — Oblon, McClelland, Maier & Neustadt, L.L.P.

(57) ABSTRACT

A filler neck assembly including a main channel for supplying a liquid into a tank and an auxiliary channel for evacuating gas from the tank. The main channel includes a tubular main body including a first end receiving a filler spout and a second end discharging the liquid into the tank. The auxiliary channel includes a first section and a second section, the first section being a channel integrally molded with the tubular main body, and the second section being formed by a feature on an exterior of the main body cooperating with a separately formed part.

12 Claims, 3 Drawing Sheets

(51) Int. Cl.
  *B29C 45/00* (2006.01)
  *B60K 13/04* (2006.01)
  *F01N 3/20* (2006.01)
  *B29K 23/00* (2006.01)
  *B29L 23/00* (2006.01)
  *B60K 15/035* (2006.01)

(52) U.S. Cl.
  CPC ........ *B60K 15/03177* (2013.01); *B60K 15/04* (2013.01); *F01N 3/2066* (2013.01); *B29K 2023/065* (2013.01); *B29L 2023/004* (2013.01); *B60K 2015/03032* (2013.01); *B60K 2015/03098* (2013.01); *B60K 2015/03348* (2013.01); *B60K 2015/03538* (2013.01); *B60K 2015/047* (2013.01); *B60K 2015/0432* (2013.01); *B60K 2015/0458* (2013.01); *F01N 2610/02* (2013.01); *F01N 2610/1413* (2013.01); *Y02T 10/24* (2013.01)

(58) Field of Classification Search
  CPC .. B60K 2015/03098; B60K 2015/0432; B60K 2015/03348; B60K 2015/03538; B60K 2015/047; B60K 2015/0458; B29C 45/003; F01N 3/2066; F01N 2610/02; F01N 2610/1413; Y02T 10/24; B29L 2023/004; B29K 2023/065
  USPC ................... 141/4–5, 54, 59, 290, 348–350; 220/86.1–86.4
  See application file for complete search history.

(56) References Cited

U.S. PATENT DOCUMENTS

| | | | | |
|---|---|---|---|---|
| 4,142,647 A * | 3/1979 | Walters | ............ | B60K 15/03504 137/587 |
| 4,185,844 A * | 1/1980 | Hubbard | ................ | B60K 15/04 141/348 |
| 4,331,185 A * | 5/1982 | Rinaldo | ............. | F16H 57/0408 141/285 |
| 4,712,709 A * | 12/1987 | Horvath | ................ | B60K 15/04 141/113 |
| 4,759,458 A * | 7/1988 | Fischer | ................... | B60K 15/04 138/109 |
| 5,244,018 A * | 9/1993 | Hasselmann | ........... | B67D 7/54 141/392 |
| 5,271,438 A * | 12/1993 | Griffin | .................. | B60K 15/04 141/302 |
| 5,704,337 A * | 1/1998 | Stratz | .............. | B60K 15/03504 123/516 |
| 5,752,553 A * | 5/1998 | Kmiecik | ................ | B60K 15/04 141/286 |
| 6,415,827 B1 * | 7/2002 | Harris | ............. | B60K 15/03519 141/302 |
| 6,648,016 B2 * | 11/2003 | Farrenkopf | ............ | B60K 15/04 137/151 |
| 8,617,675 B2 * | 12/2013 | Feichtinger | ........ | B29C 45/1657 156/245 |
| 9,061,581 B2 * | 6/2015 | Koukan | ............... | B60K 15/035 |
| 2006/0180958 A1 | 8/2006 | McClung | | |
| 2011/0139778 A1 * | 6/2011 | Feichtinger | ........ | B29C 45/1657 220/86.1 |
| 2013/0327767 A1 * | 12/2013 | Calhoun | .............. | F01P 11/0204 220/86.1 |
| 2014/0190981 A1 * | 7/2014 | Netzer | ................ | B60K 15/077 220/746 |

FOREIGN PATENT DOCUMENTS

| | | |
|---|---|---|
| CN | 201736799 U | 2/2011 |
| FR | 2 936 837 | 4/2010 |

* cited by examiner

FILLER NECK ASSEMBLY AND METHOD FOR PRODUCING SAME

The present invention pertains to the field of vehicular liquid tank assemblies, more in particular to a filler neck for an on-board liquid exhaust gas additive tank, such as a urea solution tank in a vehicle with a petrol-based internal combustion engine equipped to carry out selective catalytic reduction (SCR) of $NO_x$ fractions in the exhaust gas.

Legislation on vehicle and heavy goods vehicle emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolyzed before converting the nitrogen oxide $(NO_x)$ to nitrogen $(N_2)$ and water $(H_2O)$.

In order to do this, it is necessary to equip the vehicles with a tank containing an additive (generally urea) solution and also a device for metering the desired amount of additive and injecting it into the exhaust line.

Vehicular liquid tanks, such as the aforementioned urea tanks, must be refilled on a regular basis. To this end, the tanks have a filling orifice, equipped with a filler neck which extends to a convenient place on the periphery or on the outside of the vehicle (possibly covered by a flap or a hood). As the tank is generally a closed space, the air/vapor mixture present inside the tanks is displaced by the incoming liquid during the filling operation. The mixture attempts to flow out of the tank by flowing up the inside of the filler neck, partially pushing incoming liquid back up the filler neck, resulting in a highly undesirable spray of urea out of the filler neck.

It is known from FR 2 936 837 A1 in the name of the present applicant to provide the filler neck with an integrally formed venting tube. However, the arrangements disclosed in that application do not provide a sufficiently compact solution, in view of the scarcity of space on board the vehicles in which it is to be used, and they are not particularly simple to produce.

It is an object of the present invention to provide a filler neck assembly that at least partially overcomes these disadvantages.

According to an aspect of the present invention, there is provided a filler neck assembly providing a main channel for supplying a liquid into a tank and an auxiliary channel for evacuating gas from the tank, wherein the main channel comprises a tubular main body with a first end for receiving a filler spout and a second end for discharging the liquid into the tank, and wherein the auxiliary channel comprises a first section and a second section, the first section being a channel integrally moulded with the tubular main body, and the second section being formed by a feature on the exterior of the main body cooperating with a separately formed part.

While the main channel allows for the filling of the tank, the auxiliary channel is an integral vent channel that provides a clear path for vapor to flow back out of the tank and eliminates any spray back out of the tank. By using the inventive arrangement, the amount of space on board the vehicle—which is a scarce resource—is minimized.

The main body and the separately formed part are parts that are easy to produce. The cover is easily arranged onto the main body, for instance by gluing or welding.

The feature on the exterior of the main body may be a pair of ridges, a groove, clips, a quick-fit tube connector, or any other shape that is suitable for forming a channel section by cooperating with a separately formed part. The feature may further be shaped in such a way that it facilitates receiving and/or attaching the separate part. It may in particular comprise one or more clips, elements of a tabs-and-grooves connection, a welding or gluing flange, or the like.

In an embodiment of the filler neck assembly according to the present invention, the separately formed part comprises a tube and the feature comprises an interface for attaching the tube.

The feature may further include clips to hold the attached tube in place.

In an embodiment of the filler neck assembly according to the present invention, the separately formed part comprises a cover cooperating with the feature to create an enclosure having openings at its respective extremities, a first one of the openings providing fluid communication between the enclosure and the first section of said auxiliary channel.

This embodiment inter alia presents the advantage of avoiding the labor intensive and error prone installation of a separate vent nipple/duct. The feature on the exterior of the main body may be a pair of ridges, a groove, or any other shape that is suitable for forming a channel-shaped enclosure by covering it with a suitably shaped cover. The shape of the main body, the features, and/or the cover are chosen in such a way that the enclosure has openings at its extremities, i.e. that it forms a channel with a vapor inlet and a vapor outlet opening. One of the openings forms the interface with the first, integrally moulded, section of the auxiliary channel. The second opening may for example open up into the atmosphere or present an interface shaped to connect to further tubing.

In an embodiment of the filler neck assembly according to the present invention, the main body and the cover are separate injection molded plastic parts.

Given the geometric design of the filler neck assembly according to the present invention, the two required parts are particularly well suited for being produced by injection molding.

In an embodiment of the filler neck assembly according to the present invention, the main body and the cover are substantially made of HDPE.

This material has the advantage of being impermeable to urea, and even to hydrocarbons such as fuel (after appropriate surface treatment). In addition, it provides excellent welding compatibility with tanks that are also made of HDPE.

In an embodiment of the filler neck assembly according to the present invention, a second one of the openings is an opening in the main body near the first end.

In this arrangement, the auxiliary channel joins the main channel at the first end. This arrangement has the advantage that no separate tubing is necessary at the first end to lead away the evacuated vapors.

In a particular embodiment, the first end is provided with a flange or a thread, and the second one of the openings is arranged between the flange or thread and a region in which an end of a spout is situated during a filling operation.

This arrangement is particularly advantageous, because it allows evacuation of vapors without affecting the size constraints on the main channel at its first end. The size constraints are imposed by the use of standardized thread or flange sizes, and a standardized main channel diameter (related to the diameter of the spout to be used for filling the tank). Moreover, by arranging the second opening upstream of the spout end, accidental expulsion of liquids through the second opening can be avoided.

According to an aspect of the invention, there is provided a liquid exhaust gas additive supply system comprising a tank having a filling orifice, and a filler neck assembly as described above mounted onto the filling orifice.

According to an aspect of the invention, there is provided a vehicle comprising the liquid exhaust gas additive supply system described above.

According to an aspect of the invention, there is provided a method for producing a filler neck assembly providing a main channel for supplying a liquid into a tank and an auxiliary channel for evacuating gas from the tank, the method comprising: producing a tubular main body forming the main channel, with an integrally moulded first section and a feature on the exterior of the main body; producing a separate part; and assembling the separate part with the main body at the feature; such that the feature and the separate part cooperate to form a second section of the auxiliary channel.

In an embodiment of the method according to the present invention, the main body, the feature, and the cover are shaped so as to create an enclosure having openings at its respective extremities, a first one of the openings providing fluid communication between the enclosure and the first section of the auxiliary channel.

In an embodiment of the method according to the present invention, the main body and the cover are produced by injection molding of plastic.

In an embodiment of the method according to the present invention, the main body and the cover are substantially made of HDPE.

The technical effects and advantages of the system, vehicle, and method according to embodiments of the present invention correspond, mutatis mutandis, to those of the corresponding embodiment of the filler neck assembly according to the present invention.

These and other aspects and advantages of embodiments of the present invention will now be described with reference to the attached figures, in which.

Figure 1:
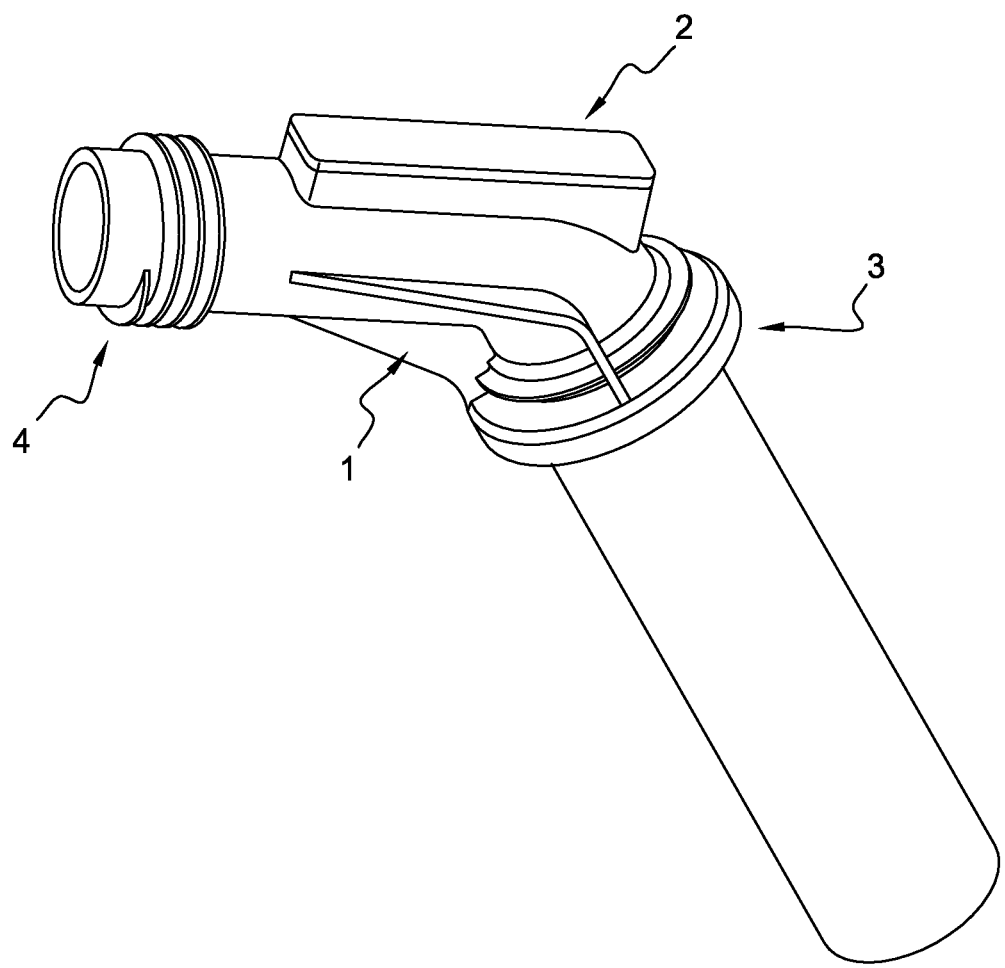
FIG. 1 shows the general architecture of a filler neck assembly according to an embodiment of the present invention.

The term "urea", as used herein, is understood to mean any, generally aqueous, solution containing urea. This includes eutectic water/urea solutions for which there is a standard quality: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The term also covers urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

The SCR process is particularly useful for vehicles with a diesel engine and certain vehicles with a gasoline engine.

The urea tank as used with embodiments of the present invention may be made from any material, preferably one that is chemically resistant to urea. In general, this is metal or plastic. Polyolefins, in particular polyethylene (and more particularly HDPE or high-density polyethylene), constitute preferred materials.

In general terms, the filler neck assembly according to the present invention provides a main channel for supplying a liquid, in particular urea, into a tank and an auxiliary channel for evacuating gas, in particular a mixture of air and urea vapors, from said tank.

The filler neck assembly according to the invention is ideally made of just two parts: an integrally formed main body and a separate part. The separate part may inter alia take the form of a tube or a cover. The term "cover" is used broadly; it may consist of a substantially planar or bent piece of material, preferably plastic, that cooperates with appropriate features (such as flanges, ridges, grooves, tabs, or protrusions) on the surface of the main body, in order to be coupled thereto so as to form a closed cavity that establishes fluid communication between the relevant openings that form the auxiliary channel as described below.

The main body may geometrically and visually consist of two sections, although it is integrally formed. Each section has a main tubular cavity, for example a cylindrical channel, extending through it. These cavities connect together to form the main channel. Even when the main body consists of a single (e.g. straight) tubular shape, the auxiliary channel will consist of two sections: a first section, which is a tubular form moulded onto the main body, and a second section, which is formed by an attached cover which encloses a certain amount of space on the outside of the main body, this space being fluidly connected to the first section. Thus, in such cases, the main body will by analogy also be referred to as consisting of two sections, the extent of its first section substantially coinciding with the extent of the first section of the auxiliary channel, and the extent of its second section substantially corresponding to the remainder of the main body.

Thus, in the "first" section, the main body has a cavity forming the main channel, and it also has an auxiliary tubular cavity extending through it, for example another, parallel cylindrical channel, separated from its main tubular cavity. The auxiliary cavity typically has a substantially smaller diameter than the main cavity, since it will only have to transport a gas flow, and no liquids.

Preferably, the two sections of the main body are geometrically configured at an angle to each other. The inner angle between the two sections is preferably in the range of 90°-180°, more preferably between approximately 115° and approximately 155°. An angled configuration generally provides more optimal usage of the available space, taking into account the fact that the end which receives the filling spout needs to be at a convenient angle for the end user. The optimal angle depends on the spatial constraints of the specific situation in which the filler neck assembly of the invention is used.

The invention will be further described with reference to a preferred orientation, in which the first section is arranged at the side of the tank, while the second section is arranged at the side where liquid urea is introduced during a refilling operation.

The second section preferably has a perforation allowing fluid communication between its main tubular cavity and the outside. This perforation will allow the auxiliary channel—to be formed by the auxiliary cavity of the first section and a cavity established under the cover—to be joined with the main channel, preferably near the free end. In the preferred orientation, the aforementioned "free end" is the end where the filling spout or filling bottle is introduced into the filler head. This arrangement allows escaping vapors to be captured at the filling end (for instance by a suction unit integrated with the filling spout), and it ensures that only one opening needs to be sealed when the filling operation is complete.

The two sections are optionally formed at an angle to each other (i.e., they exhibit an "elbow"), such that an open end of the auxiliary tubular cavity is in proximity of said angle.

To complete the auxiliary channel, the cover is arranged over the main body in such a way as to form a closed cavity that fluidly connects the open end of the auxiliary tubular cavity with the perforation of the second section.

Thus, a very compact dual channel filler neck is produced, using only two easy-to-produce parts.

FIG. 1 shows a preferred architecture of the filler neck assembly. The figure shows the two components which comprise the final assembled part—the molded filler neck (1) and the vent cover (2). The vent cover (2) is welded to the molded filler neck (1), using an appropriate technique (for example: hot plate welding, vibratory welding, ultrasonic welding). Both components are preferably injection molded plastic. The molded filler neck (1) preferably includes a weld flange (3) for welding to the SCR tank shell and threads (4) for attachment of commercially available urea refueling bottles and devices.

Figure 2:
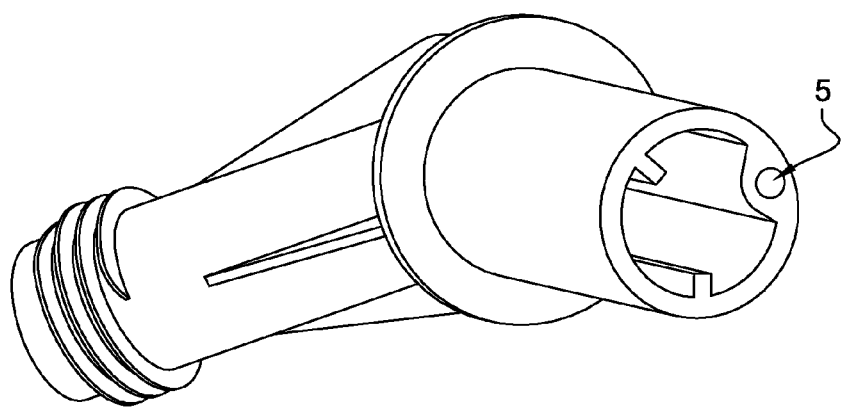
FIG. 2 shows a bottom view of the filler neck assembly according to an embodiment of the present invention.

FIG. 2 shows a bottom view of the filler neck assembly. A vent channel (5) is molded up the inside of the filler neck to transfer vapor out of the tank shell.

Figure 3:
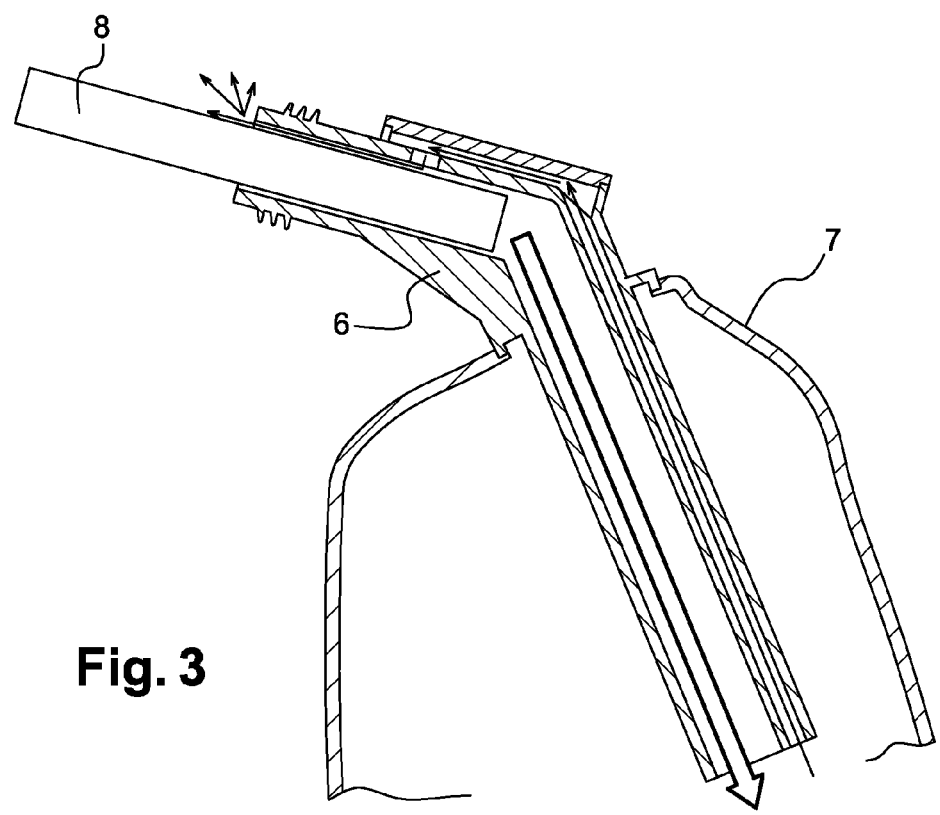
FIG. 3 shows a typical use of a filler neck assembly according to an embodiment of the present invention.

FIG. 3 shows the typical use of the filler neck assembly (6) installed into a tank shell (7), and the resultant vapor flow path from the tank, through the filler neck during nozzle (8) refilling of the tank. Liquid urea (indicated by the arrow directed downwards) is introduced into the filler neck via the nozzle (8). The vapors (arrows directed upwards) in the tank shell, which are displaced by the liquid, flow up the channel in the filler neck and are introduced into the filler neck behind the tip of the nozzle, allowing them to flow into the atmosphere without mixing with the incoming liquid flow.

Figure 4:
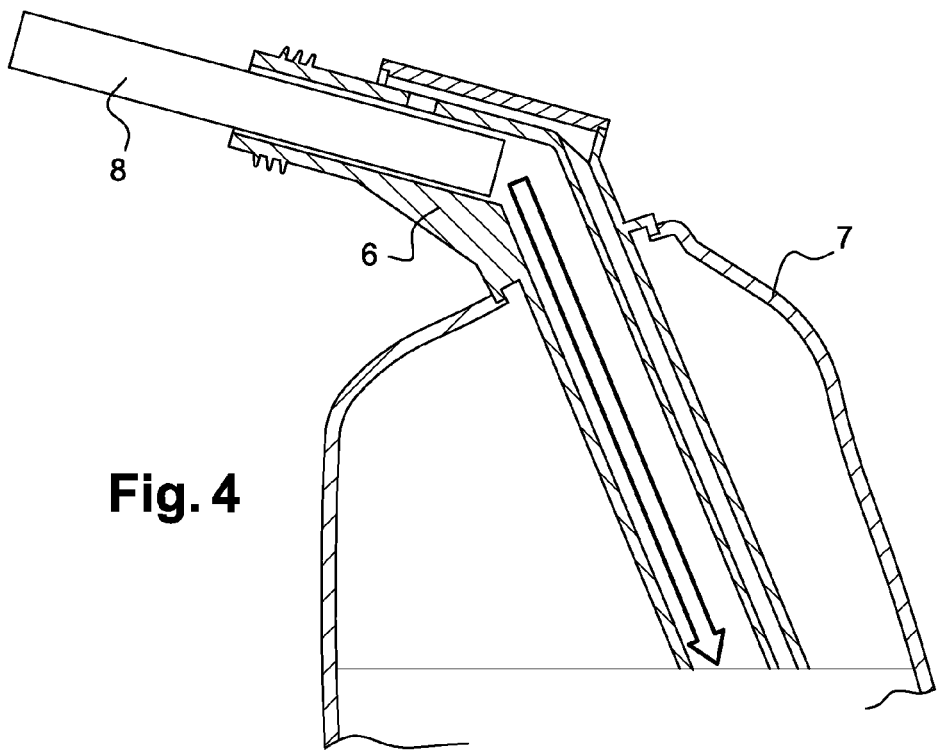
FIG. 4 shows the end of fill condition in the arrangement illustrated in FIG. 3.

FIG. 4 shows the end of fill condition. The flow channel in the filler neck is covered by the rising liquid in the tank, cutting off the vent flow and causing the nozzle to shut off and end the refilling event.

Figure 5:
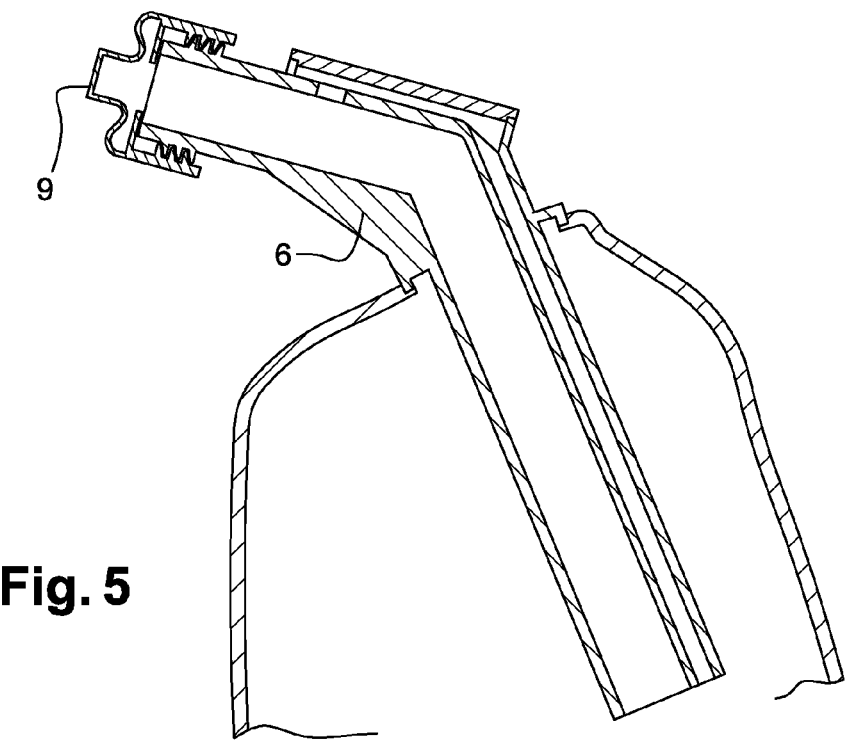
FIG. 5 shows the normal operating condition in the arrangement illustrated in FIG. 3.

FIG. 5 shows the normal operating condition, with the filler cap (9) installed. Vapors are prevented from flowing to the atmosphere by the filler cap (9), which seals off the end of the filler neck assembly (6).

The invention also pertains to a method for producing a filler neck assembly providing a main channel for supplying a liquid into a tank and an auxiliary channel for evacuating gas from the tank, the method comprising: producing a tubular main body forming the main channel; producing a first section of the auxiliary channel, integrally moulded with the main body; producing a feature on the exterior of the main body; producing a cover; and joining the cover with the main body at the feature; wherein the main body and the cover are shaped so as to create an enclosure having openings at its respective extremities, a first one of the openings providing fluid communication between the enclosure and the first section of the auxiliary channel.

In this exemplary method, the auxiliary channel is formed by a first section, which is moulded onto the main body, and a second section, which is consists of an enclosure formed by a feature (e.g., a relief portion) of the main body and a cover, the enclosure being in end-to-end fluid communication with the first section, and providing a vapor outlet at its other end.

The filler neck assembly may also be produced by a method for producing a filler neck assembly providing a main channel for supplying a liquid into a tank and an auxiliary channel for evacuating gas from the tank, the method comprising: producing a integrally formed main body comprising a first section and a second section, each of the first section and the second section having a main tubular cavity extending through it, the respective main tubular cavities forming the main channel; producing a cover; and joining the cover with the main body; wherein the first section has an auxiliary tubular cavity extending through it, separated from its main tubular cavity; wherein the second section has a perforation allowing fluid communication between its main tubular cavity and the outside; wherein the first section and the second section are formed at an angle to each other, such that an open end of the auxiliary tubular cavity is in proximity of the angle; and wherein the cover is arranged over the main body in such a way as to establish the auxiliary channel by forming a closed cavity that connects the open end of the auxiliary tubular cavity with the perforation of the second section.

The main body and the cover are preferably produced by injection molding of plastic. The main body and the cover are preferably substantially made of HDPE.

The cover is preferably welded to the main body.

According to an embodiment of the present invention, there is provided a filler neck assembly providing a main channel for supplying a liquid into a tank and an auxiliary channel for evacuating gas from the tank, the filler neck assembly comprising an integrally formed main body and a cover; wherein the main body comprises a first section and a second section, each of the first section and the second section having a main tubular cavity extending through it, the respective main tubular cavities forming the main channel; wherein the first section has an auxiliary tubular cavity extending through it, separated from its main tubular cavity; wherein the second section has a perforation allowing fluid communication between its main tubular cavity and the outside; wherein the first section and the second section are formed at an angle to each other, such that an open end of the auxiliary tubular cavity is in proximity of the angle; and wherein the cover is arranged over the main body in such a way as to establish the auxiliary channel by forming a closed cavity that connects the open end of the auxiliary tubular cavity with the perforation of the second section.

Given the geometric design of the filler neck assembly according to the present invention, the two required parts are particularly well suited for being produced by injection molding. Preferably, the main body and the cover are substantially made of HDPE.

The invention also pertains to a liquid exhaust gas additive supply system comprising a tank having a filling orifice, and a filler neck assembly as described above mounted onto said filling orifice. Preferably, the first section is arranged at the side of the tank, while the second section is arranged at the side where the additive is introduced during a refilling operation. The invention also pertains to a vehicle equipped with such a liquid exhaust gas additive supply system.

Although certain features and advantages have only been described hereinabove in connection with the filler neck assembly according to embodiments of the present invention, the skilled person will appreciate that these features, with their corresponding advantages, equally apply to the method for producing the same.

Although the invention has been described hereinabove with reference to a limited number of embodiments, this was done to illustrate and not to limit the invention, the scope of which is determined by the attached claims.

The invention claimed is:

1. A filler neck assembly comprising:
   a main channel to supply a liquid into a tank and an auxiliary channel to evacuate gas from the tank,
   wherein the main channel comprises a tubular main body comprising a first end to receive a filler spout and a second end to discharge the liquid into the tank, and
   wherein the auxiliary channel comprises a first section and a second section, the first section being a channel integrally molded with the tubular main body, and the second section being formed by a feature on an exterior of the main body cooperating with a separately formed part.

2. The filler neck assembly according to claim 1, wherein the separately formed part comprises a tube and the feature comprises an interface to attach the tube.

3. The filler neck assembly according to claim 1, wherein the separately formed part comprises a cover cooperating with the feature to create an enclosure including openings at its respective extremities, a first one of the openings providing fluid communication between the enclosure and the first section of the auxiliary channel.

4. The filler neck assembly according to claim 3, wherein a second one of the openings is an opening in the main body near the first end.

5. The filler neck assembly according to claim 4, wherein the first end includes a flange or a thread, and wherein the second one of the openings is arranged between the flange or thread and a region in which an end of a spout is situated during a filling operation.

6. The filler neck assembly according to claim 3, wherein the main body and the cover are substantially made of HDPE.

7. A liquid exhaust gas additive supply system comprising:
   a tank including a filling orifice; and
   a filler neck assembly according to claim 1 mounted onto the filling orifice.

8. A vehicle comprising the liquid exhaust gas additive supply system according to claim 7.

9. A method for producing a filler neck assembly providing a main channel to supply a liquid into a tank and an auxiliary channel to evacuate gas from the tank, the method comprising:
   producing a tubular main body forming the main channel, with an integrally molded first section of the auxiliary channel and a feature on the exterior of the main body;
   producing a separate part; and
   assembling the separate part with the tubular main body at the feature such that the feature and the separate part cooperate to form a second section of the auxiliary channel.

10. The method according to claim 9, wherein the separate part comprises a cover, and the main body, the feature, and the cover are shaped so as to create an enclosure including openings at its respective extremities, a first one of the openings providing fluid communication between the enclosure and the first section of the auxiliary channel.

11. The method according to claim 10, wherein the main body and the cover are produced by injection molding of plastic.

12. The method according to claim 10, wherein the main body and the cover are substantially made of HDPE.

* * * * *